Feb. 27, 1968   J. S. HERR   3,370,796
MIXING APPARATUS
Filed March 12, 1965   4 Sheets-Sheet 1

INVENTOR
JOSEPH STANLEY HERR

BY Mason, Fenwick & Lawrence
ATTORNEYS

Feb. 27, 1968  J. S. HERR  3,370,796
MIXING APPARATUS
Filed March 12, 1965  4 Sheets-Sheet 2
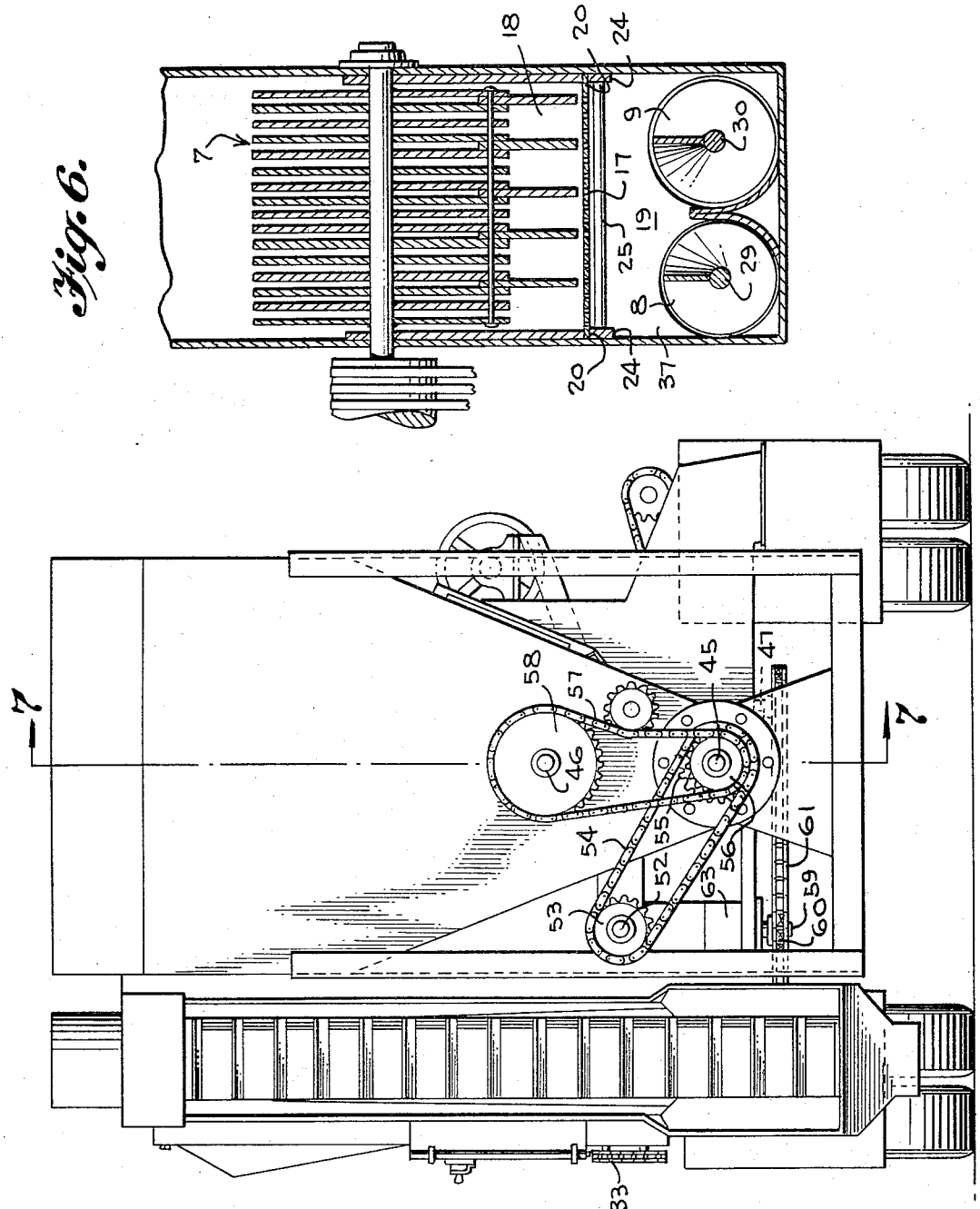
INVENTOR
JOSEPH STANLEY HERR
BY Mason, Fenwick & Lawrence
ATTORNEYS

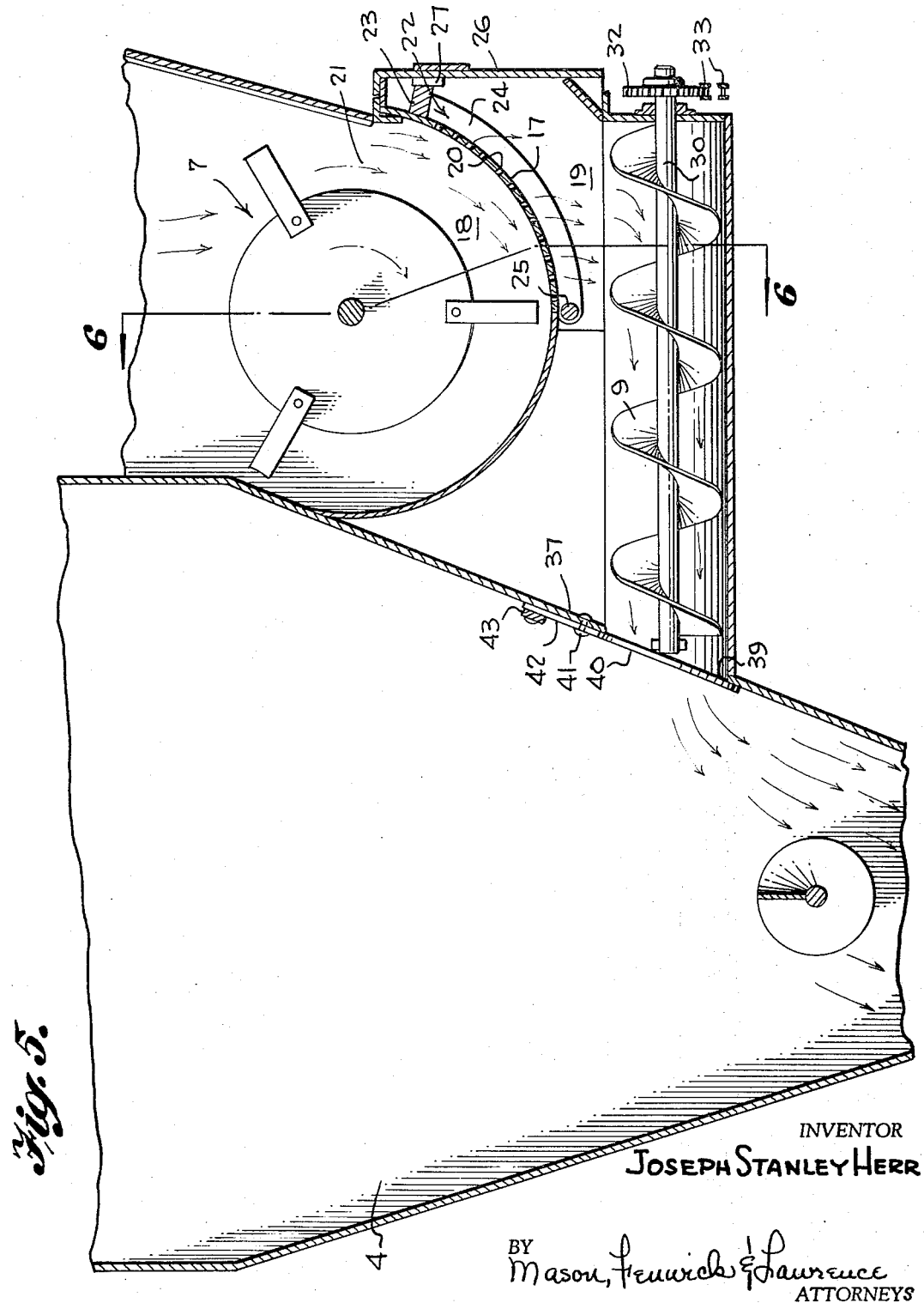

Feb. 27, 1968 J. S. HERR 3,370,796
MIXING APPARATUS
Filed March 12, 1965 4 Sheets-Sheet 4
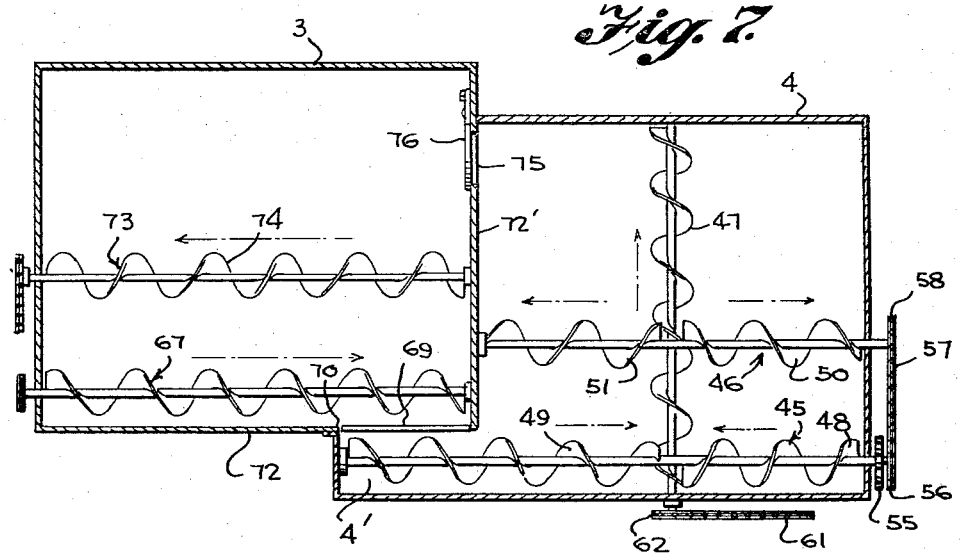
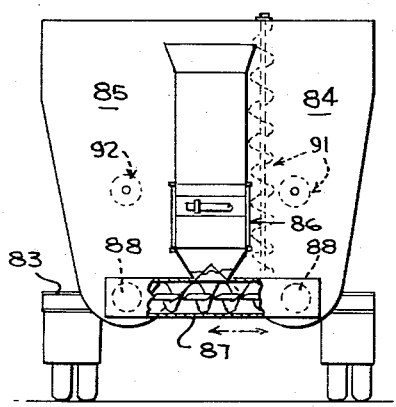
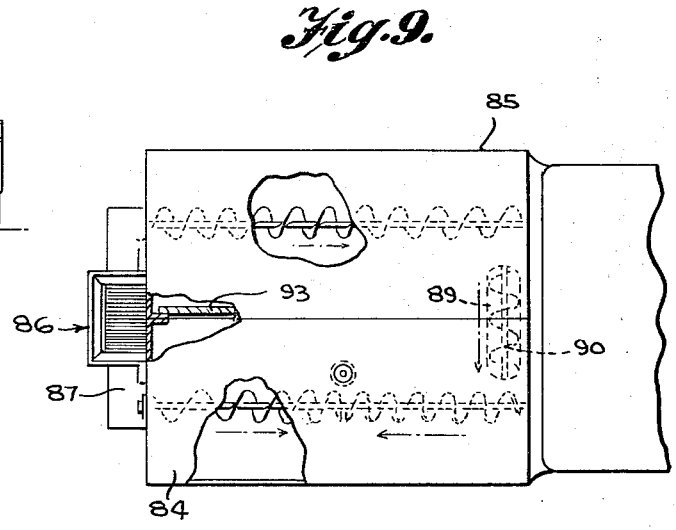
INVENTOR
JOSEPH STANLEY HERR
BY Mason, Fenwick & Lawrence
ATTORNEYS United States Patent Office 3,370,796
Patented Feb. 27, 1968

3,370,796
MIXING APPARATUS
Joseph Stanley Herr, Nottingham, Pa.
(P.O. Box 1416, Wickenburg, Ariz. 85358)
Filed Mar. 12, 1965, Ser. No. 439,393
6 Claims. (Cl. 241—101)

ABSTRACT OF THE DISCLOSURE

Feed mixing apparatus consisting of a loading tank and a mixing tank, with provision for feeding material to either tank selectively. The two tanks are separated by a wall having two closeable openings, to permit flow of material from the loading tank to the mixing tank and return. Control of the openings will allow loading the loading tank while mixing in the other with subsequent transfer from the loading to the mixing tank, or use of the two two tanks as a single mixing chamber by circulation through both tanks. A removable screen for a hammermill is also provided, having a retainer which is held in screen-retaining position by the hammermill access door, and will drop by gravity to free the screen when the access door is opened.

---

This invention relates to apparatus for mixing and/or transporting feed or feed materials, and particularly to such apparatus including plural compartments.

Conventional feed mixers have a compartment into which feed materials are placed for mixing. Material circulating means are mounted in the compartment for mixing different granular feed materials with one another and with additives, such as molasses. These machines, while effecting a proper mixing of the feed, are limited to just this use. Frequently, it is desirable to transport more than one batch of materials to a location for subsequent mixing. This cannot be done with a single compartment mixer. Usually much time is lost in loading the mixer, for the loading cannot begin until a previous batch is mixed and unloaded.

The primary object of the present invention is to provide improved mixing apparatus which contains at least two feed containers, or chambers, to permit loading one while mixing in the other, or simultaneous separate storage of two feed materials.

Another object is the provision of such apparatus having means to convert the plural chambers into a single mixing chamber of increased capacity.

A further object is to provide an improved screen mounting for hammer mills, particularly adapted for use with mixing apparatus, to enable quick and easy removal and replacement of the screen when changing screen is necessary.

Other objects of the invention will become apparent from the following description of practical embodiments of the invention when taken in conjunction with the drawings which accompany, and form part of, this specification.

In the drawings:

FIGURE 4 is a rear elevation of the mixing apparatus shown on an enlarged scale;

FIGURE 5 is a transverse section taken on the line 5—5 of FIGURE 3;

FIGURE 6 is a vertical section through the hammer mill taken on the line 6—6 of FIGURE 5;

FIGURE 7 is a vertical longitudinal section through the mixing apparatus taken on the line 7—7 of FIGURE 4;

FIGURE 8 is a somewhat diagrammatic rear elevation of a modified structure; and

FIGURE 9 is a top plan view of the structure shown in FIGURE 8.

In general, the invention consists in a double compartment mixing apparatus, wherein one compartment is the mixer proper and the other is a storage or auxiliary mixing compartment. There is means leading from a hammer mill to direct feed to either compartment, and there is communication between the two compartments to allow feed in the loading compartment to be moved to the mixing chamber. Means are provided to permit use of the two compartments as a single mixing chamber. The hammer mill is specially constructed to facilitate removal of the grinding screen.

Figure 1:
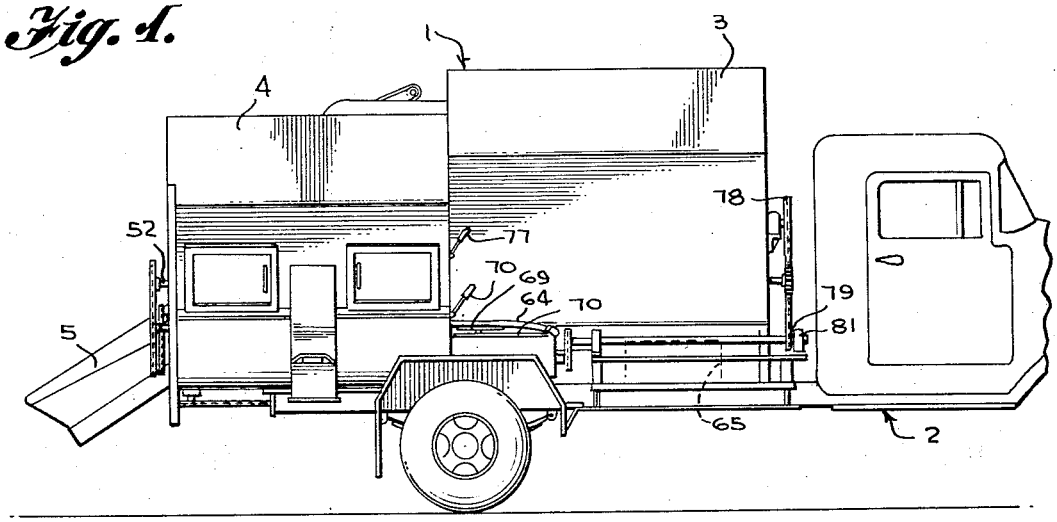
FIGURE 1 is a side elevation of the improved mixing apparatus mounted upon a vehicle.
Figure 2:
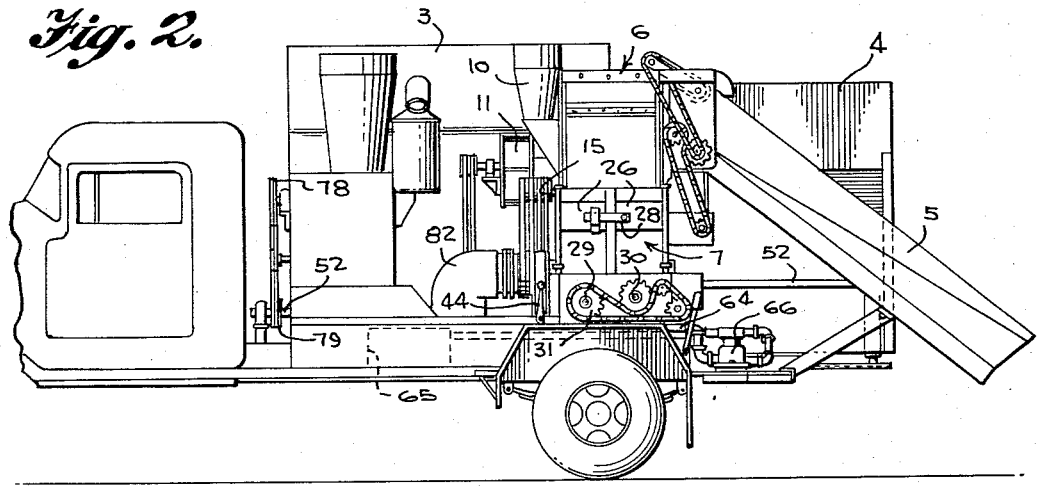
FIGURE 2 is an elevational view of the opposite side of the apparatus.
Figure 3:
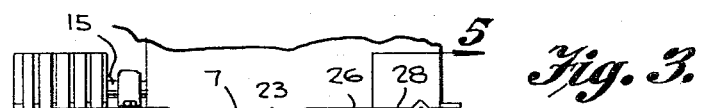
FIGURE 3 is a detailed view on an enlarged scale of the hammer mill with one of the access doors open to expose the screen.

Referring to the drawings in detail, and first to that form of the invention shown in FIGURES 1 to 7, there is shown mixing apparatus 1 mounted on a truck chassis 2 for mobility. There are two tanks, or compartments, 3 and 4 arranged in tandem on the truck frame. A vertically swingable lift conveyor 5 is mounted to transport feed materials dumped into receiving hopper 6 to the top of the apparatus for delivery to a hammer mill 7. Screw conveyors 8 and 9 carry ground feed from the hammer mill to the respective tanks. A cyclone 10 is arranged in a dust conduit which includes a fan 11. The cyclone discharges clarified air from the top to atmosphere, and returns the dust material being handled by the conveyors 8 and 9. This general arrangement of feed handling, except for the plural tanks, is disclosed in detail in my prior Patent No. 2,546,747, granted Mar. 27, 1951.

Hammer mill 7 is conventional insofar as the general housing 12 and rotor 13 is concerned. The rotor consists of spaced disks 14 fixed on a shaft 15, with swinging blades 16 mounted between the disks. The rotor operates in a shell chamber, the lower portion of which is formed by an arcuate perforated screen 17. The screen constitutes a divider between the mill grinding chamber 18 and the conveyor chamber 19 in which the screw conveyors 8 and 9 operate.

The screen is removable for changing or for access to the grinding chamber. The screen spans the hammer mill housing, and seats against arcuate shoulders 20 formed on the side walls 21 of the housing 12. A hinged retainer 22 fits perimetrically against the screen along at least three edges to hold the screen in proper position upon the shoulders 20. The retainer consists of a U-shaped frame, having a straight bridge member 23 to rest against the upper straight edge of the screen, and two arcuate arms 24, curved to match the screen curvature and adapted to engage the arcuate edges of the screen to hold the screen in close engagement with shoulders 20. The arms 24 are pivotally attached at their free ends to the side walls 21 of the housing, as at 25. When the retainer is raised to contact the edges of the screen, the screen will be held in place against shoulders 20. When the retainer is swung downwardly, the screen is free and may be removed.

The retainer is held in its raised, screen-contacting position by means of doors 26, which form outer closures for the conveyor chamber 19. Bearing pads 27 are located at the junctures of the bridge member and side arms, and are of such thickness that the doors 26 will contact them and hold the retainer in position against the screen when the doors are closed. A suitable latch 28 locks the doors in closed position and holds the screen in assembled position. When the doors 26 are opened, the retainer will drop down of its own weight, and the screen will be free for removal.

Feed material entering the chamber 19 from the hammer mill will be subjected to the action of conveyors 8 and 9 for transportation through the chamber. These conveyors are augers which extend through the chamber in horizontal, parallel relation. The shafts 29 and 30 of the augers extend through the forward wall of chamber 19 and carry sprockets 31 and 32. A chain 33 is trained over the sprockets in a manner to rotate the augers reversely, and also passes over an idler sprocket 34 and a sprocket 35 on a power shaft 36. The inner ends of the augers terminate just short of the inner wall 37 of chamber 19 to provide for movement of feed material through the entire chamber.

At the ends of augers 8 and 9 there are outlet openings 38 and 39 in the inner wall of chamber 19. These outlets open, respectively into the tanks, or compartments, 3 and 4. A swinging cut off plate 40 is pivotally connected at 41 to the inner wall 37 to close one of the openings 38 and 39. A lever arm 42 extends from the plate and is connected by linkage 43 with a control lever 44, mounted at a convenient place on the truck. Operation of lever 44 will move the plate 40 to open outlet 38 to allow feed to flow into tank 3, or to open outlet 39 to permit feed entry into tank 4.

As mentioned above, tanks 3 and 4 are arranged in tandem. Tank 3, however, is raised slightly above tank 4, and tank 4 has its lower section extended to project beneath the adjacent lower corner of tank 3. This provides an extension 4' at the bottom of tank 4 for a purpose to be described.

Mixing tank 4 may be quite similar to the mixing tank of my prior Patent No. 2,576,177, granted Nov. 27, 1951. For purposes of illustration, the tank is shown as equipped with a lower screw type conveyor 45, extending along the tank bottom and into the chamber extension 4', and an upper screw conveyor 46 parallel to the lower one and located higher in the tank. A vertical auger 47 is positioned midway of the tank, offset laterally to clear the conveyors 45 and 46. The horizontal conveyors 45 and 46 each have two screw sections, with the screw helices being oppositely disposed on opposite sides of the longitudinal center of the tank 4. On the lower conveyor, the screws 48 and 49 are arranged to feed from the ends of the compartment toward the center. On the upper conveyor the arrangement is reversed to provide screws 50 and 51 which feed from the center toward the ends. This will cause the feed to be moved across the bottom of the tank toward the center where it will be lifted by the vertical screw 47, and then carried outwardly by the upper auger to fall again to the tank bottom as the feed in that area is moved. Thus, a circulation of the feed is caused, which, together with the churning action of the screws, will achieve complete and thorough mixing of the ingredients.

The conveyors 45, 46 and 47 may be driven from a common power shaft 52. A sprocket 53 is shown on shaft 52, and is connected by chain 54 with a sprocket 55 on the shaft of conveyor 45. A second sprocket 56 on shaft 45 drives a chain 57 over a sprocket 58 on the shaft of conveyor 46. A spur shaft 59 is driven from shaft 52 and carries sprocket 60 which, through chain 61, drives a sprocket 62 on vertical conveyor shaft 47. A suitable clutch 63 may be included in the drive line to permit the mixing conveyors in tank 4 to be operated, or stopped, independently of the other mechanism of the apparatus.

A molasses line 64 is provided from a supply source 65 into the tank 4 adjacent one end. A pump 66 is used to carry the molasses from the source to the tank 4.

The storage, or loading, tank 3 also has conveyors for moving the feed material. A lower conveyor 67 is mounted in the bottom of tank 3 at a lever intermediate conveyors 45 and 46 in the mixing tank. The screw 68 of this conveyor is arranged to move material in the bottom of the tank toward, and into, mixing tank 4. A door 69 is movable by means of lever 70 to open and close an opening 71 in the bottom 72 of tank 3. Opening 71 will allow feed under the influence of conveyor 67 to drop through the bottom of tank 3 into chamber extension 4' where it is picked up by the auger 49 of the conveyor 45 and moved toward the center of tank 4.

Tank 3 also has an upper conveyor 73 which is somewhat above conveyor 46 in tank 4. The screw 74 of conveyor 73 moves feed from the partition wall 72' toward the opposite end of tank 3. An opening 75, in wall 72' adjacent the top of tank 4, permits flow through from tank 4 to tank 3. A door 76, controlled by handle 77, allows closing and uncovering the opening 75.

Conveyors 67 and 73 are driven from power shaft 52 by means of chain drives 78 and 79. Clutches 80 and 81 permit independent operation of these conveyors as circumstances require. Shaft 52 may be driven from a suitable motor 82, and the hammer mill power shaft 36 may receive its power from the common power shaft 52.

With the apparatus just described, it is possible to direct feed material from the hammer mill into the mixing tank 4, start the mixing operation, and then load tank 3 during the mixing process. To do this, doors 69 and 76 will be closed to keep the tanks separated. When the mixing is completed, outlet 83 may be opened and the feed emptied. As soon as the mixed feed has been discharged, outlet 83 will be closed, door 69 opened and conveyor 67 started to transfer the feed material from tank 3 to tank 4 for mixing. This materially reduces the operating time required for obtaining successive mixed batches. When it is desirable to mix larger batches of feed material, the doors 69 and 76 may be opened and feed material moved by conveyor 67 will be carried through opening 71 into the extension 4' of tank 4 and picked up by conveyor 45. Material lifted and circulated by conveyors 46 and 47 toward wall 72' will pass through opening 75 to be picked up by conveyor 73 and carried along tank 3. As conveyor 67 moves material toward wall 72', material carried by conveyor 73 will drop down to take its place. Thus, circulation is set up through the two tanks. The two tanks can be used as storage tanks for transportation of separate materials, by loading one tank with one material, shifting gate 40 to its opposite position and feeding different material to the hammer mill for carriage to the other tank.

In FIGURES 8 and 9, a modified form of apparatus is shown. The principal difference between this structure and that previously described lies in the arrangement of the tanks and the position of the hammer mill. In the first described form, the tanks are arranged in tandem while in the form shown in FIGURES 8 and 9 the tanks are placed side by side. The hammer mill is positioned at the back, and the feed conveyor may be reversed to carry feed material to either tank.

More specifically, the apparatus includes a truck chassis 83 on which a mixing tank 84 and a storage, or loading, tank 85 are mounted. A hammer mill 86 is mounted centrally at the back of the tanks and empties into a conveyor line 87. A screw conveyor 88 is mounted in the line for operation in opposite directions for moving feed from the hammer mill to either tank. At the other end of the tanks there is a connecting conduit 89 having a screw conveyor 90. To move material from tank 85 to tank 84, a door 93 is placed between the two tanks near the top. To mix large batches door 93 is opened to permit material to pass from tank 84 to tank 85. Mixing tank 84 may have the same conveyor arrangement 91 as the mixing tank 4 of the first described form. The loading tank 85 may have similar conveyors 92 to the conveyor arrangement of loading tank 3 of the previously described form. The various conveyors may be suitably connected to, and driven from a source of power, not shown. With this arrangement, the same operational procedures may be followed as before.

While in the above, practical embodiments of the invention have been disclosed, the detailed structure shown

What is claimed is:

1. Feed mixing apparatus comprising, a closed mixing tank and a closed loading tank having a common wall between them, a first opening in the common wall to allow flow of material from the loading tank to the mixing tank, a second opening in the common wall spaced from the first to allow flow of material from the mixing tank to the loading tank, doors associated with the first and second openings and operable to close the first and second openings, means selectively operable to supply material to the loading tank and to the mixing tank, separate conveying means within the loading tank to move material to the first opening and to move material from the second opening, separate conveying means in the mixing tank to move material from the first opening and to move material to the second opening and to circulate material in the mixing tank, and means to supply feed material to the loading tank, whereby material may be fed from the loading tank to the mixing tank when the door associated with the first opening is open, material may be mixed in the mixing tank while material is fed to the loading tank when both the doors are closed, and material may be mixed and circulated when both doors are open.

2. Feed mixing apparatus as claimed in claim 1 wherein, the means to supply feed material includes a hammermill having a housing with a rotor chamber and a conveyor chamber, an arcuate screen separating the rotor and conveyor chambers, arcuate shoulders on the housing against which the screen seats, an access door hingedly connected to the housing adjacent the screen, and a screen retainer pivotally connected to the housing adjacent one edge of the screen for gravitational swinging movement outwardly toward the door when the door is open and having arcuate arms to releasably contact the screen and hold the screen against the shoulders when in raised position, the door when closed being in bearing contact with the screen retainer to hold the retainer in raised position.

3. Feed mixing apparatus as claimed in claim 1 wherein, the means to supply feed material to the loading tank has communication with the mixing tank, and means to control supply of feed material to the respective tanks.

4. Feed mixing apparatus as claimed in claim 1 wherein, the conveying means in the mixing and loading tanks are independently operable.

5. Feed mixing apparatus as claimed in claim 1 wherein, the means to supply feed material to the loading tank includes a screw conveyor, the loading tank having an inlet to which the screw conveyor leads, a second supply screw conveyor, the mixing tank having an inlet to which the second screw conveyor leads, and selectively operable closure means for the inlet to the loading tank and the inlet to the mixing tank.

6. Feed mixing apparatus as claimed in claim 1 wherein, the mixing and loading tanks are arranged in side-by-side relation, the means to supply feed to the loading tank is connected to one of the conduits, and the conduit to which the feed supplying means is connected has a reversibly operable conveyor, whereby feed material may be supplied selectively to the loading tank and to the mixing tank.

References Cited

UNITED STATES PATENTS

| | | | |
|---|---|---|---|
| 1,433,865 | 10/1922 | Wolf | 259—97 |
| 1,563,101 | 11/1925 | Offenhauser | 259—69 |
| 1,713,355 | 5/1929 | Shelton | 241—89 |
| 2,845,255 | 7/1958 | Herr | 259—6 |
| 2,953,360 | 9/1960 | Kline | 259—9 |

GERALD A. DOST, *Primary Examiner.*